UNITED STATES PATENT OFFICE.

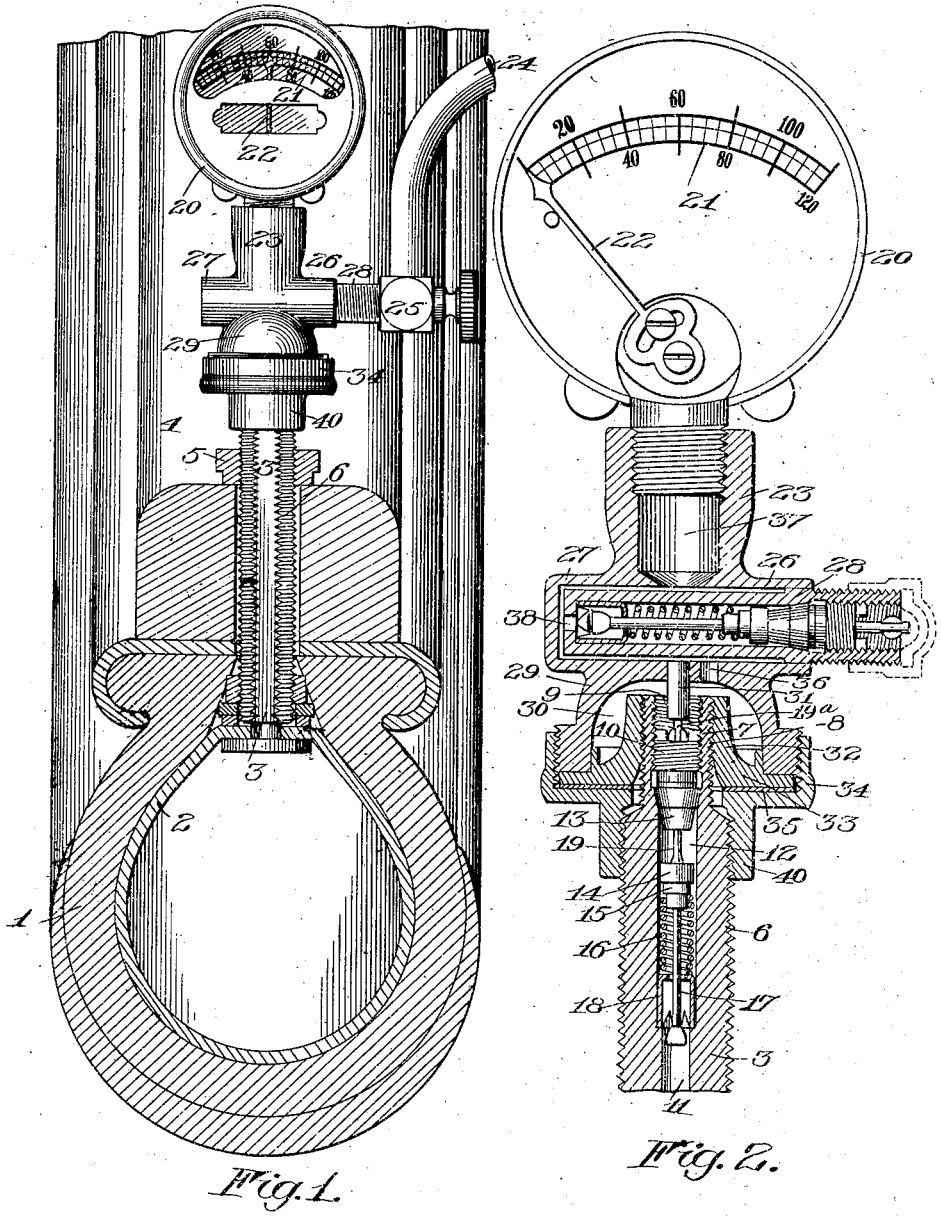

GEORGE W. KELLOGG, OF ROCHESTER, NEW YORK, ASSIGNOR TO KELLOGG MANUFACTURING COMPANY, OF ROCHESTER, NEW YORK, A CORPORATION OF NEW YORK.

PRESSURE-GAGE.

1,038,385.  Specification of Letters Patent.  Patented Sept. 10, 1912.

Application filed November 6, 1909. Serial No. 526,510.

*To all whom it may concern:*

Be it known that I, GEORGE W. KELLOGG, of Rochester, in the county of Monroe and State of New York, have invented certain new and useful Improvements in Pressure-Gages; and I do hereby declare the following to be a full, clear, and exact description of the same, reference being had to the accompanying drawings, forming a part of the specification, and to the reference-numerals marked thereon.

My present invention relates to pressure gages or registering devices and it has for its object to provide an instrument of this character which is adapted particularly to be used in conjunction with receptacles containing air or other fluid under pressure applied by means of a pump, said device being primarily intended for use in conjunction with the inflated tires of motor vehicles or automobiles, the parts thereof being so arranged that it may be quickly attached to the usual valve stem of the tire.

To these and other ends the invention consists in certain improvements and combinations of parts all as will be more fully described, the novel features being pointed out in the claims at the end of the specification.

In the drawings: Figure 1 is a view showing in elevation a pressure gage constructed in accordance with my invention, and used in conjunction with a pneumatic tire, the latter being shown in cross section. Fig. 2 is a vertical sectional view showing the internal construction of the device.

Similar reference numerals in the several figures indicate similar parts.

A pressure gage constructed in accordance with my invention is adapted particularly to be used during the operation of inflating a pneumatic vehicle tire, its primary object being to indicate the number of pounds pressure of the air as the latter is forced into the tire by the usual pump, but it will be understood that the device is equally applicable to a tank or any other form of receptacle in which it is desirable to ascertain the pressure of the fluid contained therein.

In a device of this character intended to be used by automobilists, it is desirable that it be simple in construction with the various parts made in compact form and so designed that there is little or no liability of their becoming deranged, yet permitting the device to be easily applied to or removed from the valve stem of the tire without the use of tools.

In illustrating the pressure gage embodying my present invention, I have illustrated a form of pneumatic tire indicated by 1 provided with the inner tube 2 from which leads the valve stem 3 having its outer end projecting through the felly 4 of the wheel, to which it is attached by the locking nut 5. The valve stems of pneumatic tires are provided throughout their length with threads indicated by 6 and at their outer ends are provided with a neck of reduced diameter, as indicated by 7, which are provided with external threads 8 to receive the usual valve cap or closure (not shown), and internal threads 9 in which the locking collar 10 of the valve mechanism is secured. The valve stems are provided with a central perforation 11 which is enlarged at its outer end to form the chamber 12 in which the valve proper is located. The latter may be of the usual or any preferred construction, but as the well known Schraeder valve is the one universally used, I have illustrated this type which comprises the perforated head 13, the inner end of which forms a seat upon which the resilient packing 14 of the plunger 15 is normally held by the extensible spring 16. The plunger 15 is mounted upon the rod 17 guided at its lower end in the cage 18 and having the upper end or extension 19 which projects outwardly through the head 13 and nut 10, its extremity 19$^a$ lying in such position that it may be depressed to move the plunger 15 into the position shown in Fig. 2 for the purpose of opening the valve either to facilitate inflating the tire or to allow the escape of fluid therefrom.

The pressure gage indicated by 20 may be provided with any suitable form of mechanism which is adapted to be operated by the air or other fluid admitted thereto and it comprises a suitably graduated scale 21 with which coöperates the indicating finger 22. This part of the apparatus is rigidly connected to a member 23 which performs the dual function of providing a means for attaching the gage to the valve stem 3 and also a convenient attachment for the pump connection shown in the present instance as a flexible tube 24 in Fig. 1, having at its extremity a coupling 25 for detachably connecting it to the pressure gage. The member 23 is provided with a central chamber formed by the laterally extending portions 26 and 27 which form a convenient handle for rotating the member 23 during the operation of applying the gage to a valve stem and it also accommodates the valve parts mounted in the shell 28 which are provided to prevent the escape of the air or other fluid when connection has been established between the gage and the valve stem, as shown in Fig. 2. The lower end of the member 23 is cup-shape, as indicated at 29 which is provided with an interior recess 30, as shown, within which is centrally located a stud or pin 31 adapted to project into the neck or reduced portion of the valve stem and to engage the end 19$^a$ of the valve releasing rod and automatically open said valve when the gage is applied to the valve stem.

The preferred form of connection between the member 23 and the valve stem consists in providing a nut 40 which is adapted to engage the screw threads 6 on the large portion of the stem 3 and arranging within the recess a sleeve 32 which is adapted to similarly engage the exterior of the neck or reduced portion of the valve stem. In arranging these parts I prefer to form the sleeve 32 of rubber, the central aperture therein being of such size that as the member 23 is drawn downwardly by the nut 40, said sleeve will be expanded and slip over the threads of the neck 7 and form an air tight joint by engagement therewith. This arrangement I find to be advantageous in practice on account of the difference in the lead or pitch of the threads employed upon the large and small portions of the valve stem, and further, it obviates the necessity of providing other packing to secure an air tight joint. The sleeve 32 is provided with a base portion or flange 33 overlying the rim of the cup 29 with which it is held in engagement by the flange on the nut 40, which latter is secured to member 23 by the threaded flange 34. Between the nut 40 and the flange of the sleeve is arranged a washer 35. Leading from the recess 30 is an aperture 36 communicating with the chamber containing the valve 28 and from said chamber the passage 37 leads to those devices employed for operating the indicating finger 22 of the gage. The valve shell 28 is provided with the aperture 38 through which air or other fluid escapes into the surrounding chamber when the pump connection is established therein, as shown in Fig. 1.

The simple and compact arrangement of the parts of the device adapts it particularly for the purpose intended. In the embodiment of the invention shown and described herein the attachment of the gage may be quickly made and the reading of the gage obtained immediately for it is merely necessary for the operator to rotate the member 23 a sufficient number of turns to cause the threads 6 acting on the nut 40 to draw the sleeve 32 downwardly onto the neck 7 of the valve and move the pin or valve operating projection 31 into engagement with the valve releasing pin 19, thus automatically operating the latter and opening communication from the tire, or other device containing fluid under pressure, to the gage.

By mounting the gage on the member 23 and in alinement therewith the means for engaging it with a valve stem may be arranged at the other extremity of said member, as the whole device may be made of such dimensions as to permit it to be easily rotated between the spokes of a wheel.

I claim as my invention:

1. The combination with the valve stem of a pneumatic tire, of a tubular member, a pressure indicating device, a device mounted on the tubular member adapted to coöperate with the valve stem of the tire, a transversely arranged chamber extending on opposite sides of the tubular member and arranged between the pressure indicating device and the last mentioned device, said chamber being provided with a valve controlled inflating connection, and the tubular member having movement longitudinally of the valve stem whereby to cause said last mentioned device to engage and open the valve in the tire.

2. The combination with the valve stem of a pneumatic tire, of a vertically disposed tubular member having a transversely arranged chamber extending on opposite sides thereof, a valve controlled inflating connection at one end of said chamber, a pressure indicating device arranged on the tubular member above the transverse chamber, a device mounted on the tubular member below the transverse chamber and adapted to coöperate with a valve located in said valve stem, the tubular member having movement longitudinally of the valve stem whereby to cause said device to engage and open the valve in the valve stem.

3. The combination with the valve stem of a pneumatic tire, having a reduced threaded end portion, of a tubular member having a valve controlled inflating connection, a pressure indicating device arranged on the tubular member above the inflating connection, a device mounted on the tubular member below the inflating connection and adapted to coöperate with the valve located in said valve stem, a collar attached to the end of the tubular member and having threaded engagement with said valve stem, a bushing secured between the collar and the end of the tubular member and having threaded engagement with the reduced end of the valve stem whereby said tubular member is movable longitudinally of the valve stem to cause said device to engage and open the valve in the valve stem.

4. The combination with the valve stem of a pneumatic tire having a reduced threaded end portion, of a tubular member having a transversely arranged chamber, a valve controlled inflating connection at one end of said chamber, a pressure indicating device arranged on the tubular member above the chamber, a device mounted on the tubular member below the chamber and adapted to coöperate with a valve located in the valve stem, a collar secured to the end of the tubular member and having threaded engagement with said valve stem, and a bushing arranged between the collar and the end of the tubular member and having threaded engagement with the reduced end of the valve stem whereby the tubular member is movable longitudinally of the valve stem to cause said device to engage and open the valve in the valve stem.

GEORGE W. KELLOGG.

Witnesses:
G. WILLARD RICH,
RUSSELL B. GRIFFITH.